March 12, 1929.  W. F. GROENE  1,705,218
MILLING MACHINE
Filed Jan. 4, 1924   5 Sheets-Sheet 2

INVENTOR.
William F. Groene
BY
ATTORNEYS.

March 12, 1929.  W. F. GROENE  1,705,218
MILLING MACHINE
Filed Jan. 4, 1924   5 Sheets-Sheet 3

March 12, 1929.  W. F. GROENE  1,705,218
MILLING MACHINE
Filed Jan. 4, 1924   5 Sheets-Sheet 4

March 12, 1929.  W. F. GROENE  1,705,218
MILLING MACHINE
Filed Jan. 4, 1924   5 Sheets-Sheet 5

INVENTOR:
William F. Groene
BY
ATTORNEYS.

Patented Mar. 12, 1929.

1,705,218

UNITED STATES PATENT OFFICE.

WILLIAM F. GROENE, OF CINCINNATI, OHIO, ASSIGNOR TO THE R. K. LE BLOND MACHINE TOOL COMPANY, OF CINCINNATI, OHIO, A CORPORATION OF DELAWARE.

MILLING MACHINE.

Application filed January 4, 1924. Serial No. 684,306.

My invention relates to milling machines and other machine tools, and has particular relation to the mode of operating a work carrying member by rapid traverse as well as by normal work feed.

In my United States Letters Patent No. 1,316,230, I show and describe a milling machine which embodies many of the essential ideas of my present invention, and upon which my present invention, as described in this specification, is an improvement.

In the said patent is illustrated a milling machine in which the usual standard, knee, saddle and table are shown, with all speed change mechanisms located in the standard, and a single input shaft from the standard to the knee by means of which all feeds for the knee, saddle and table are obtained.

I retain the same general arrangement in the machine of this invention, and will not describe the selective gearing in the knee for the several drives, but will refer to the said patent for a description of said gearing.

In my said patent I show a single hand lever by means of which the one input shaft to the knee is controlled to couple said shaft at the standard end thereof with the change gear work drive, the rapid traverse drive, and with forward and reverse for each drive. This lever, moreover, moves in a single plane in my patented machine, in the arc of a circle, as compared to the usual right and left, forward and back movement of most single lever selective controls.

One of the expedients of my said patented machine is to so arrange the coupling of the rapid traverse to the input shaft, that the work feed connections thereto may be left in operative position with relation to the shaft while the traverse is also connected thereto. In order to accomplish this a pawl and ratchet drive is used as the connecting element between the work feed gear box and the input shaft, so that when said shaft is rapidly rotated by the traverse element, the pawl will slip over the ratchet, due to the ratchet revolving so rapidly with the input shaft, that the pawl can not come into engagement.

One of the objects of this improvement over my said patent, is to mount the control lever for rapid and work feeds, on the knee, so as to bring it within the grasp of the operator standing in front of the table, and to do this I have provided a rotary mechanism which establishes the connections at the standard to the input shaft. Another object of my invention is to mount the speed change levers of the work feed gear box at the knee, and to provide a simple movable structure for holding the change lever connecting rods in the knee, so that the movement of the knee has no interference for the said connecting rods.

Another object of my invention herein is to improve the mode of driving the input shaft from the feed box, omitting all beveled gears.

Chiefly it is my object, however, as has been stated, to retain the various advantages resultant from the construction and mode of operation of my former patent, and at the same time to bring all operating levers to the knee so as to be convenient to the operator without change of position from that ordinarily assumed by him in facing the work carried upon the knee.

I accomplish my object above stated and other advantages to be noted by that certain construction and arrangement of parts to be hereinafter more specifically pointed out and claimed.

I hereby refer to my former patent, above identified, for the details of structure of a milling machine to which my present invention is applied. I have shown in the drawings the standard 1 of a milling machine, to which power is applied by a pulley 2, or any other desired means. The operating spindle is indicated at 3, the knee at 4 and the ways for the knee on the standard at 5. The saddle I show at 6 and the table at 7.

The mechanism which I propose to describe in some detail is that whereby a feed box, the casing of which is shown at 8 on the standard, drives the various mechanism in the knee, saddle and table though the medium of a shaft 9, preferably a single shaft, which I have termed herein the input shaft, and those mechanisms whereby work speeds and traverse speeds are applied to this single shaft from the feed box.

Figures 6, 7:
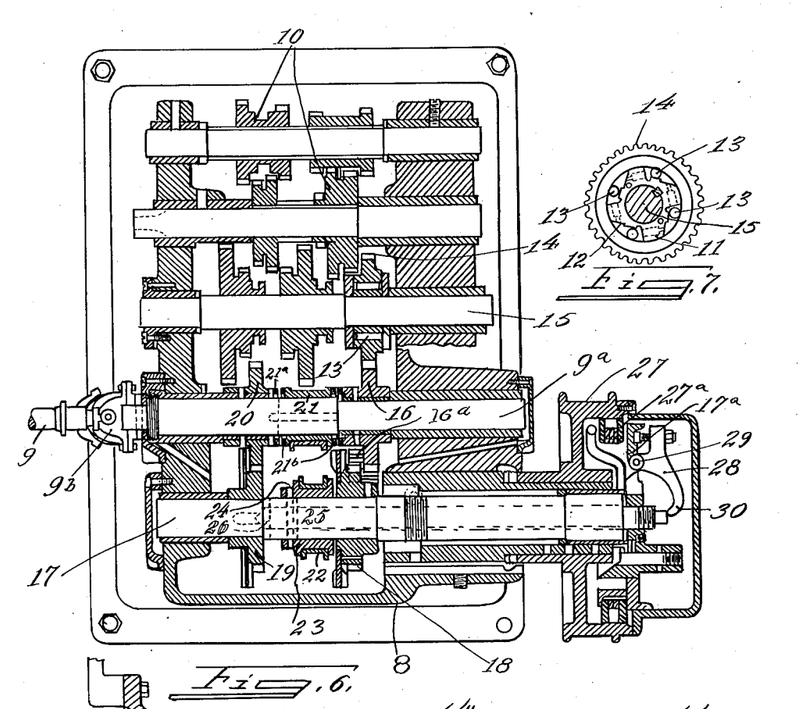
Figure 6 is a vertical section taken through the feed box.
Figure 7 is a detail vertical section of the ball ratchet drive element.

Referring first to the feed box, it will be noted that in the upper, inner portions thereof, are located the change speed gearing devices of the work speed feeds of the machine. As a change speed gearing is old, I have merely indicated some of the members of the several gear trains generally as 10, all trains terminating in a ball ratchet gear which meshes with the input shaft driving devices. This gear has an internal spider 11 having sloping faces 12 for its arms, the spaces between the arms serving as races for balls or rollers 13. Around the spider is the gear 14, and the spider is driven by the shaft 15 on which it is placed, while the gear 14 is free to turn in one direction with relation to the spider. The other direction of movement of spider and gear will result in the balls or roller riding up on the slanting faces 12 and coming into clamping engagement with the bore of the gear 14.

The driven shaft of the feed box is indicated at 9$^a$, and is connected by a universal joint 9$^b$ with the input shaft 9, already noted. A gear 16 loose on this shaft is in mesh at all times with the ball ratchet gear 14. A jack shaft 17 mounted next below the shaft 9$^a$, has thereon a tight gear 18 which is driven constantly by the gear 16 with the intervention of a reversing pinion or gear 16$^a$ of double the width of the other two gears.

The jack shaft has another tight gear 19 thereon which meshes with a second loose gear 20 on the shaft 9$^a$. A splined shifter spool 21 having clutch faces at 21$^a$ and 21$^b$ for like clutch faces on the gears 16 and 20 respectively, is moved along the shaft 9$^a$ to engage selectively the said two gears with the shaft, or to take a neutral position between said two gears. This clutch thus controls the forward and reverse rotation of the input shaft. A rapid rotation imparted to the jack shaft by some additional means, will rotate the shaft 9$^a$ either forward or reverse, as controlled by said clutch member, without regard to the feed through the ball ratchet, which will merely slip around without engagement between the balls and the gear 14.

Figure 2:
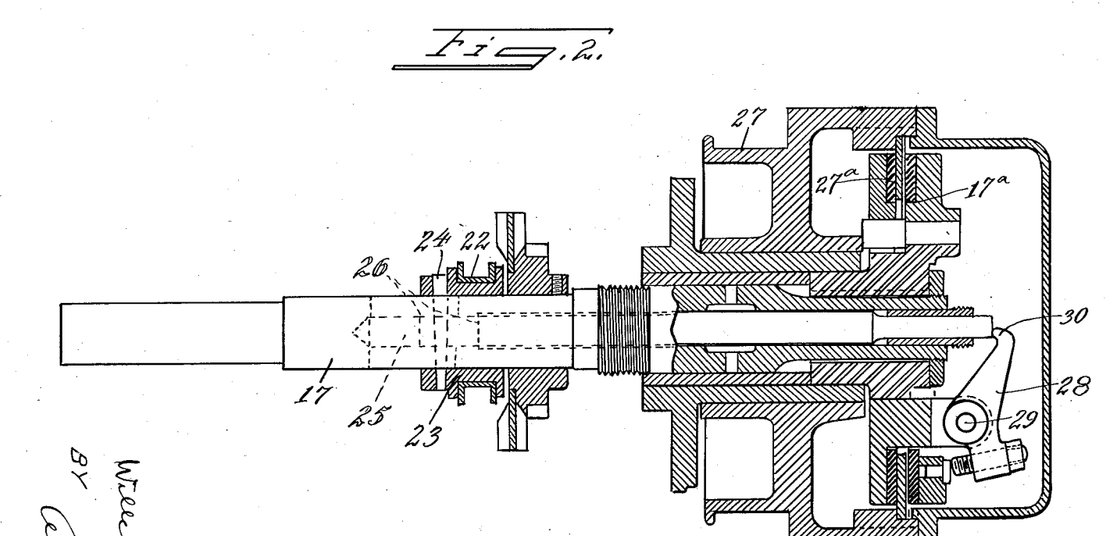
Figure 2 is a horizontal section taken through the friction clutch and pulley mechanism used in the rapid traverse.
Figure 3:
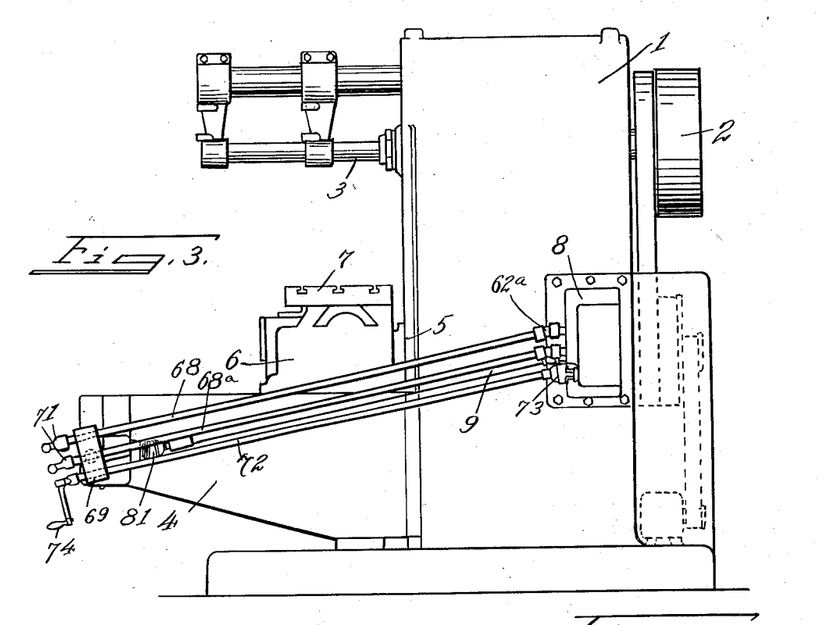
Figure 3 is a side elevation of a milling machine, showing the arrangement of the shafts and rods from the knee to the feed box on the standard.

The mechanism for driving the jack shaft rapidly is provided by preferred means of a friction clutch to eliminate jars in starting and stopping. A spool 22 on the jack shaft, and rotating therewith is provided with a hub 23, which is united by a pin 24 with a sliding rod within the jack shaft. This rod is shown at 25, and the jack shaft is slotted at 26 to permit the passage of the pin, and to give full length movement for the rod.

The friction clutch can be of any type, and I have shown it as comprising a pulley element 27, for a belt from the main driving pulley, or any motive power could be applied instead of this pulley element. The jack shaft projects loosely through the hub of the pulley, and friction disks 27$^a$ for the pulley element, and 17$^a$ for the jack shaft are forced into frictional driving contact with each other by means of one or more levers 28. These levers or lever are suitably pivoted at 29 and have their ends 30 projected into the path of the end of the rod 25 that passes through the jack shaft. By pushing the said rod toward the lever ends the levers are rocked to a position for setting up the frictional drive. When the rod is withdrawn some suitable spring device will cause the levers to follow the rod and open up the friction, releasing the drive.

I have not described the clutch in detail aside from the mode of operating it, as any such clutch will serve my purpose. It should be noted, however, that the levers are in position to push against the rod 25, and tend to return it to friction releasing position.

Thus the result of moving the spool 22 is to operate the jack shaft direct from the friction pulley, in which case the work feed mechanism will remain in its operative condition, ready to take up the work feed as soon as the friction is released.

It is provided by me, that the setting of the forward or reverse for input shaft feed, in the manner described, shall be combined with the moving of the jack shaft rod, so that the direction of feed will first be determined before the traverse from the friction pulley can be applied. It is also my object to provide for sufficient spring resistance to the operating mechanism, that should the operator release the tension applied by him to effect the traverse, the traverse will move out of driving relation automatically.

The mode of operation of the two spools will also be controlled by a rotary member, since, as has been noted, the carrying of the operating handle on the knee will necessitate a universal joint, and a telescopic form of engagement of the control rod, with the knee, the combination of such devices resulting in making it too hard to apply a reciprocating movement to the control element for shifting the two collars.

A shaft 31 is mounted in the lower front side of the gear case or feed box, extending horizontally and a vertical pin 32 is set up behind this shaft. A pair of sleeves 33 on the pin 32 have forks 34 for controlling the two spools 21 and 22.

The sleeves also have arms 35, which project to a point to bring their ends above and below the shaft 31. The upper arm 35 controls the spool 21 and the lower arm 35 controls the spool 22.

Figures 8, 11, 12:
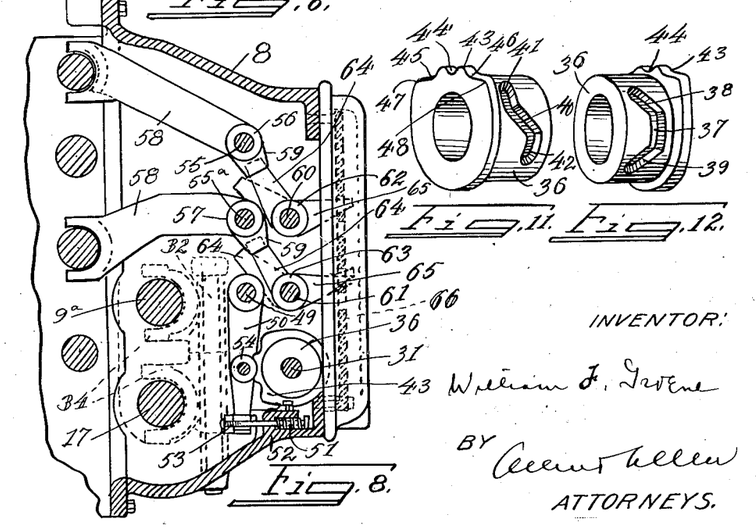
Figure 8 is a detail front elevation with the casing partly broken away showing the feed box.
Figure 11 is a perspective of one side of the operating cam for the shifter arms.
Figure 12 is a perspective of the other side of said cam.
Figure 13:
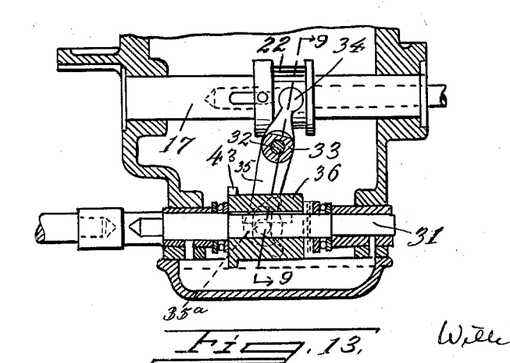
Figure 13 is a vertical section taken through said control cam.

A cam drum 36 mounted on the shaft 31 has a specially formed groove for studs or rollers 35ª on the ends of the two arms. The groove for the control of spool 22, and hence of the rapid traverse, is shaped with a neutral stretch 37, a forward control stretch 38, and another forward control stretch 39.

The groove for the control of spool 21 has a slanting stretch 40, and circumferential stretches 41 and 42 at the ends thereof. The groove part 40 throws the spool 21 to left and right of neutral and grooves 41 and 42 hold the spool in its adjusted position.

The revolution of the drum will not effect the spool 22 except at the two extremes of its movement, and at the two extremes of its movement, the drum will not effect the spool 21, while in the intermediate parts of its movement the slanting stretch 40 on the drum will shift the spool 21.

To hold the cam drum in neutral position, with spool 21 so held that neither the forward or reverse drive is in mesh and also to hold the said cam drum in position in which the forward and reverse are in mesh but the spool 22 has not begun its movement, I provide a cam 43 on the one end thereof.

This cam has a neutral position notch 44, forward and reverse position notches 45 and 46 respectively, and shoulders 47 and 48 located beyond the notches 45 and 46.

On a mounting rod 49 is pivoted a lever 50, and the end of this lever is pulled by means of a spring 51, set in a housing 52, and arranged to press on the end of a link 53 on the lever end. This spring is preferably a compression spring, wound around the link and engaging a nut on the end thereof for adjustment.

The result of this structure will be that a roller 54 on the lever will engage the surface of the cam, and will fall into the respective notches thereof as the cam drum is revolved. During the rapid traverse positions of the drum, however, the roller will rest on the elevated shoulders 47 and 48, and release of tension by the operator on the drum shaft will result in the drum revolving back by pressure of the lever spring, to a position whereby the lever roller will engage in either of the notches 45 or 46.

While the spring on the clutch element might be, and in some instances will be sufficient to accomplish this reversal of the cam drum, the addition of the spring lever and shoulder device will greatly facilitate it. The beneficial result, as has been noted, is that the operator must hold onto his control lever while the traverse is in force, and the moment he lets go of the lever, the work feed will pick up the input shaft again and the work feed will continue. As should be noted also the cam 43 and its engaging elements, for holding the work feed, and neutral positions of the input shaft drive have been located in the gear case, and it is not necessary to apply any further stops to the control lever.

Figures 9, 10:
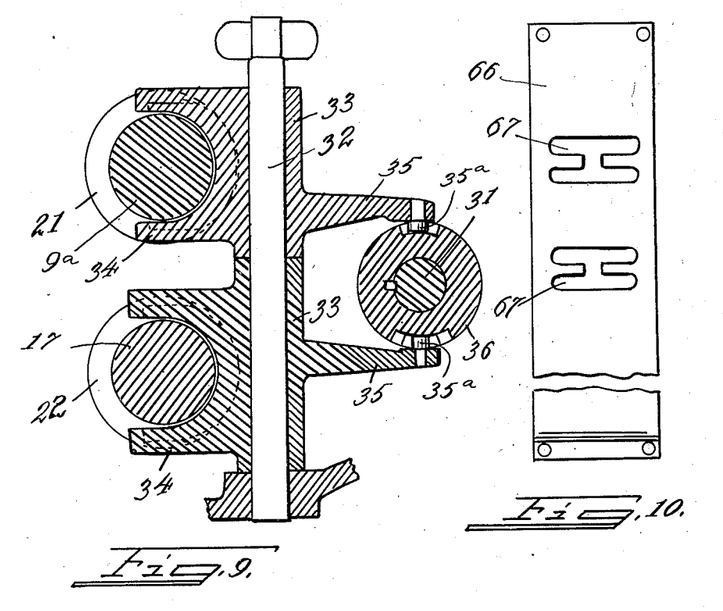
Figure 9 is a detail section on the line 9—9 of Figure 13 showing the cam controlled shifter arms.
Figure 10 is a detail plan of the guide plate for the gear shift lever mechanism.

Referring briefly to the method of control of the work feed gear train, for the purpose of indicating the mode of operating thereof, it will be noted that there are a pair of cross shafts 55 and 55ª, on which are the sliding gear shifters having hubs 56 and 57. In the machine shown there are four of these shifters (two being shown in Figure 8), each having a shifter arm 58 thereon, and extending forwardly from the hubs are the forks 59. The rocking and sliding shafts 60 and 61 are mounted in the front of the feed box below the shafts 55 and 55ª, and these shafts have thereon the sleeves 62 and 63, each sleeve having two divergent fingers 64 thereon. By sliding the shafts and hence the sleeves 62 and 63, whichever finger 64 as is in engagement with a fork 59 will slide it along in the direction in which the sleeve is moved along its shaft. By rocking the shafts, one or the other of the fingers 64 thereon will come into mesh with one of the forks.

In order to form a guide and stop for the rocking and sliding motion of the shafts 60 and 61, I form on the sleeves 62 and 63, the fingers 65, which fingers lie in slots in a plate 66, set in the front of the feed box. The slots 67 in this plate 66 are of the familiar H-slot type, with the transverse portions defining the rocking motion of the two shafts, and the up and down defining the in-and-out motion of the two shafts.

It will not be necessary for an understanding of the action of the shifters to explain in detail the gear assembly, as such a gear assembly with sliding elements to be engaged by the shifter arms is very familiar in practice.

It will now be evident that I require three control rods extending from the feed box to the knee of the machine, in order to accomplish (a) the rocking through five positions of the cam drum that controls the forward and reverse and work and traverse feeds, and (b) to accomplish the rocking and in-and-out movement of the work feed shifter arms, although of course two of the rods could be omitted if desired to operate the gear shift at the standard. These rods will require a universal joint connection with the knee and feed box, and further will require a slidable mode of mounting or a telescopic function of some character to allow for the changes in position of the knee at its several points of elevation, and the variation in distance from the mounting point on the knee to the universal joint connection at the feed box.

I make provision for the above as follows:—For the work feed gear shifters, I provide the rods 68 and $68^a$, which rods are connected to the shafts 60 and 61 by universal joints $62^a$.

Figures 4, 5:
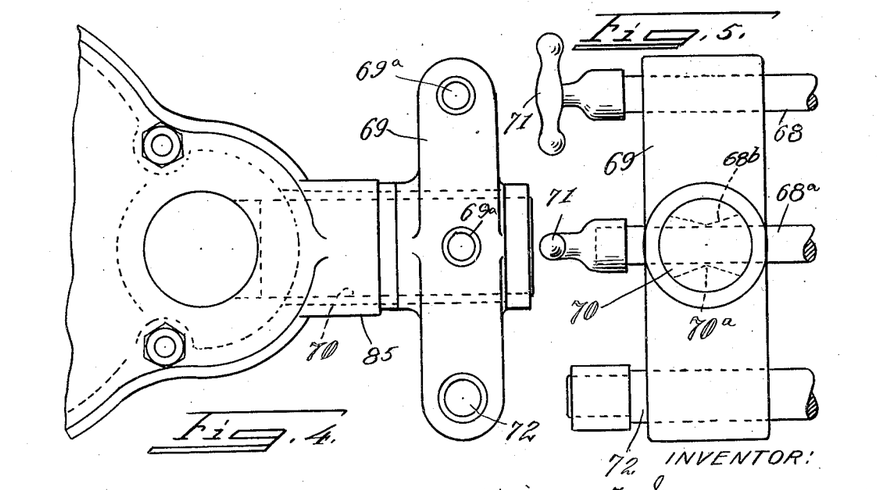
Figure 4 is a detail front elevation of the rocker head in which the several control rods are carried on the knee.
Figure 5 is a side elevation detail of the part shown in Figure 4.

The rods extend along the side of the machine to the knee where they pass through a holder 69, that is mounted, as will be described, to rock on a horizontal pivot. The holder has holes $69^a$ therein through which the rods pass, the mounting stud 70 has a hole $70^a$ of approximately the diameter of the rod $68^a$ at the middle thereof and tapered outwardly at $68^b$, so that the rods may tilt in the hole, since the stud is fixed. The rods have handles 71 on the ends thereof, whereby they may be pushed in and out and rocked. The handles will preferably be arranged so that when set in vertical position, the work feed will be in neutral position, thereby providing a guide for the operator.

A chart can then be provided which will show the operator to what positions to move the control handles in order to put into operation the desired speed of work feed. The location of the H-slot device in the work feed, thereby permitting the ready carrying of the control rods on the knee, is thus no disadvantage to the operator.

The control rod 72 for the traverse and work feeds, and forward and reverse, is connected by a universal joint 73 with the cam drum shaft, and also extends through the rocking holder on the knee. The handle 74 for this rod will be moved in a single plane, since the said rod is revolved only to accomplish the several feeds desired. As pointed out, it will not be practical in the best sense to attempt to provide for an in-and-out, to-and-fro movement of this control rod, and furthermore, such a motion is not fully practical in the best sense, where it is desired to automatically throw off the rapid traverse and permit the work feed to take hold whenever the control rod handle is released by the operator. Finally, the enforcement of a setting of the work feed to forward or reverse before the rapid traverse is thrown in is best accomplished by a movement in a single plane of the control rod or handle.

Figure 1:
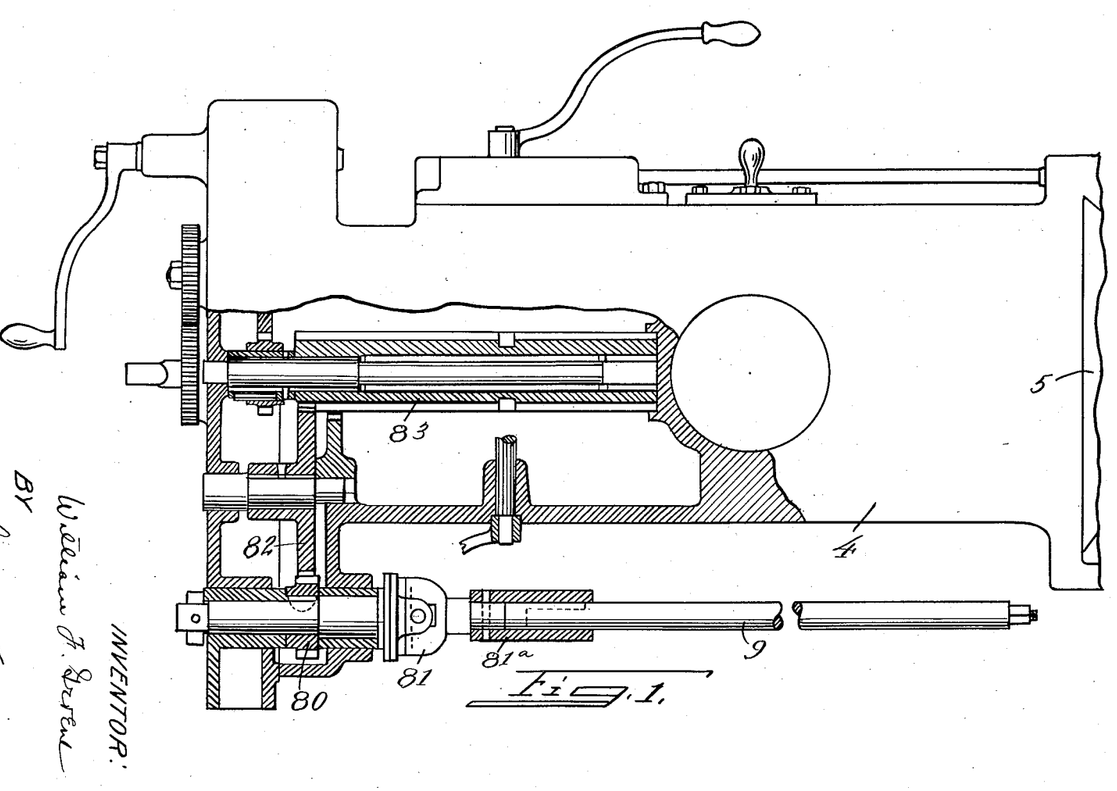
Figure 1 is a plan view of the knee with parts removed to illustrate the knee connection of the input shaft.

Referring briefly to the knee itself, I have shown the input 9 as connected with the gear 80 in the knee by means of a universal joint 81, which joint has a telescopic joint $81^a$ with the said input shaft. The gear 80 meshes with gear 82, and thus drives the cylindrical gear 83 from which the various drives to the knee, table, and saddle are obtained. I have referred, and again here refer to my patent above identified, for full description of an acceptable mode of driving the said portions of a milling machine.

The rocking holder of the several control rods is journaled on the stud 70, which extends outwardly from boss 85 formed on the end of the knee that faces the control rod side of the machine.

The machine parts now described will operate as has been noted to permit the operator to stand in front of the knee and control all feeds without moving from this position. The safety trips and clutches for the knee saddle and table, will naturally be controlled from the same point. As the knee moves up and down, the control rods tilt at their universal joints, and slide in and out of the holder, while the holder will also rock to permit the tilting of the control rods. Since the knee in this instance has an up-and-down motion only, there is no need of a universal joint mounting of the control rod holder.

While I have described the several features of this invention in detail, it will be understood that I do not therefore wish to exclude from the scope of my invention the mechanical equivalents of the several elements described.

Having thus described my invention, what I claim as new and desire to secure by Letters Patent, is:—

1. A feed for milling machines and the like, said feed comprising a train of selective gears terminating in a ratchet gear, a shaft having idler gears thereon and a clutch splined to the shaft and alternatively connecting the idler gears, a jack shaft having a pair of gears thereon meshing with said idler gears, one of said pair through the intervention of a reversing gear, and means for independently driving the jack shaft at a more rapid rate than the ratchet.

2. A feed for milling machine and the like, said feed comprising a train of selective gears terminating in a ratchet gear, a shaft having idler gears thereon and a clutch splined to the shaft and alternatively connecting the idler gears, a jack shaft having a pair of gears thereon meshing with said idler gears, one of said pair through the intervention of a reversing gear, and means for independently driving the jack shaft at a more rapid rate than the ratchet gear, said jack shaft driving means comprising a sliding rod through the jack shaft, a friction clutch having a driving element, and an element connected to the jack shaft, and a controlling element in the path of the sliding rod, whereby sliding of the rod will operate the clutch.

3. A feed for milling machines and the like, said feed comprising a train of selective gears terminating in a ratchet gear, a shaft having idler gears thereon, and a clutch splined to the shaft and alternatively connecting the idler gears, a jack shaft having a pair of gears thereon meshing with said idler gears, one of said pair through the intervention of a reversing gear, and means for independently driving the jack shaft at a more rapid rate than the ratchet gear, and a controlling device of the feed comprising a pair of shifters, one to operate the clutch and the other to set into operation the independent drive, and a common element for energizing said shifters.

4. A feed for milling machines and the like, said feed comprising a train of selective gears terminating in a ratchet gear, a shaft having idler gears thereon and a clutch splined to the shaft and alternatively connecting the idler gears, a jack shaft having a pair of gears thereon meshing with said idler gears, one of said pair through the intervention of a reversing gear, and means for independently driving the jack shaft at a more rapid rate than the ratchet gear, and a controlling device for the feed comprising a pair of shifters, one to operate the clutch and the other to set into operation the independent drive, and a common element for energizing said shifters, said element adapted to shift first the clutch operating shifter, and next the independent drive shifter.

5. In a milling machine or the like, the combination with a pair of shifters, one to control direction of movement and one the speed of movement of a knee driving shaft, and a control element for said shifters comprising a rotary member having shifter engaging faces, one of said faces having a slanting portion intermediate its ends, and straight portions at its ends, and the other of said faces having a straight portion at its intermediate points, and slanting ends, said faces being set to engage the shifters simultaneously, resulting in a movement of one shifter while the other is standing still in a definitely timed relation.

6. In a metal working machine having a knee and a standard, the combination of mechanism in the knee to be driven, a driving element therefor located on the standard, and control means for the driving element located on the knee, said control means comprising rods extending to the standard, said rods having joints therein to permit of tilting thereof and a holder for the rods located on the knee, said holder being tiltable with relation to the knee, and having holes thereon for slidably engaging the rods, and a mounting stud for the holder having a hole tapered from the openings at the sides of the holder to a smaller diameter approximately that of the rods, intermediate their ends.

7. In a metal working machine, the combination of a standard and a knee, mechanism in the knee to be driven, a work feed gear change element, located on the standard, driving connection between said element and the knee, and controlling means for the said gear change element mounted on the knee, and extending back to the said element, and means located on the standard for retaining the controlling means in shifted positions for establishment of varying speed changes, said last named means comprising an H-slot plate on the standard, and an element controlled by the said controlling means, and engaging in said H-slot.

8. In a metal working machine the combination with a knee and standard, of mechanism in the knee to be driven, a work and traverse feed element for the knee located on the standard, said element comprising a reversing mechanism and a traverse clutch, a single rod extending to and mounted on the knee for controlling said reversing mechanism, and traverse clutch, and means on the standard for releasably retaining the reversing mechanism in adjusted relation, without retaining the traverse clutch in operative and inoperative position.

9. In a milling machine or the like, the combination with a pair of shifters, one to control direction of movement, and one the speed of movement of a knee driving shaft, and a control element for said shifters having a selective movement first to operate the direction movement shifter, and next the speed of movement shifter, and means acting on the control element and adapted to releasably hold it in positions of operation of the direction shifter, and to constantly oppose the movement of the control element in positions of operation of the speed shifter, whereby release by the operator of the control element when in speed control position will result in its movement away from such position.

10. In a machine tool, a standard, and a knee movable with relation thereto, a drive for the knee located in the standard including forward and reverse, work feed and traverse, and gear change work feed gears, a single movable element in the standard adapted to control the shift from work feed to rapid traverse and forward and reverse in an enforced sequence, connections from this element to the knee, and operable at the knee for moving said element, and connections from the gear change work feed gearing to the knee, also controllable from the knee.

WILLIAM F. GROENE.